United States Patent [19]

Toda et al.

[11] 4,162,511
[45] Jul. 24, 1979

[54] VELOCITY CORRECTION SYSTEM FOR VIDEO DISC PLAYER

[75] Inventors: Minoru Toda; Susumu Osaka, both of Machida; Yasushi Matsumoto, Narashino, all of Japan

[73] Assignee: RCA Corporation, New York, N.Y.

[21] Appl. No.: 896,056

[22] Filed: Apr. 13, 1978

[30] Foreign Application Priority Data

Apr. 19, 1977 [GB] United Kingdom ............... 16280/77

[51] Int. Cl.² ............................................. G11B 3/10
[52] U.S. Cl. ........................... 358/128; 179/100.4 D; 179/100.4 E; 274/23 R; 360/36; 360/70; 360/75
[58] Field of Search ................ 358/128; 179/100.3 V, 179/100.41 K, 100.41 P, 100.4 ST, 100.4 D, 100.4 E; 360/36, 86, 107, 70, 75; 274/23 A, 23 R

[56] References Cited

U.S. PATENT DOCUMENTS

| | | | |
|---|---|---|---|
| 3,183,516 | 5/1965 | Sliter | 360/75 |
| 3,787,616 | 1/1974 | Falk et al. | 360/36 |
| 3,824,352 | 7/1974 | Adler et al. | 179/100.41 P |
| 3,965,482 | 6/1976 | Burrus | 358/128 |

OTHER PUBLICATIONS

Tamura et al., "Electroacoustic Transducers with Piezoelectric High Polymer Film", Journal of the Audio Engineering Society, Jan./1975, vol. 23, No. 1, pp. 21–26.

Primary Examiner—Bernard Konick
Assistant Examiner—Donald McElheny, Jr.
Attorney, Agent, or Firm—Eugene M. Whitacre; Joseph S. Tripoli; Dilip A. Kulkarni

[57] ABSTRACT

A pickup cartridge for use in a velocity correction system includes a polymer bimorph element mechanically interposed between a cartridge housing and a pickup arm carrying a groove-riding stylus. Signals representative of cyclical deviations in the stylus/record relative velocity are applied to the polymer bimorph element to cause displacement of the groove-riding stylus in a manner that opposes cyclical deviations.

9 Claims, 10 Drawing Figures

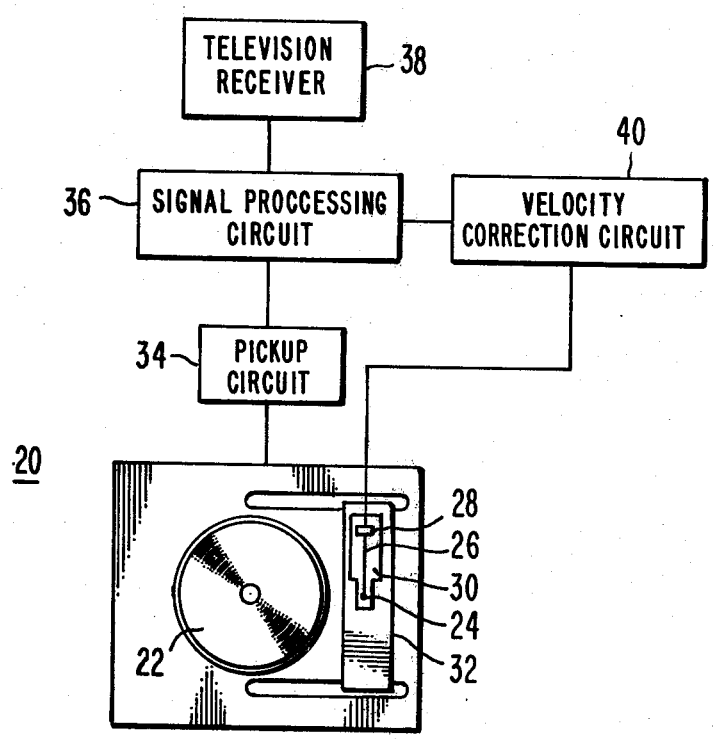
Fig.1.
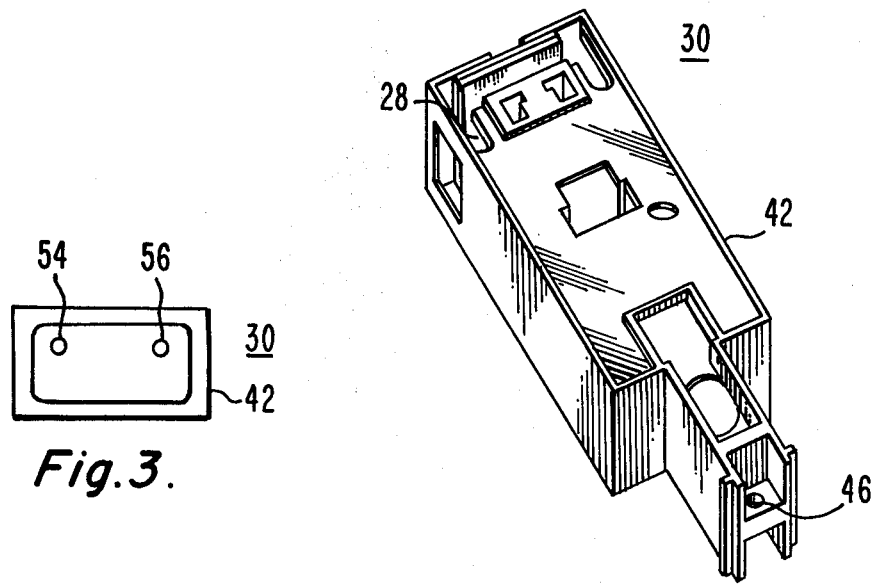
Fig.3.
Fig.2.

VELOCITY CORRECTION SYSTEM FOR VIDEO DISC PLAYER

This invention generally pertains to a video disc system, and, more particularly, it relates to an apparatus for maintaining the stylus/record relative velocity substantially constant in a video disc system.

In certain video disc systems, video information is recorded by means of geometric variations in the bottom of a smooth spiral groove on the surface of a disc record. The record surface includes a coating of conductive material which is preferably covered with a thin deposit of dielectric material. A pickup stylus, supported at one end of a stylus arm, engages the spiral groove and includes a conductive electrode which establishes a capacitance with the conductive coating and the dielectric deposit of the record. When the record is rotated, the stylus/record capacitance varies in response to the geometric variations in the bottom of the spiral groove. The capacitance variations are converted to electrical signal variations by suitable signal processing circuitry coupled to the stylus electrode. The output signal of the signal processing circuitry may be coupled to a conventional television receiver for reproduction. The other end of the stylus arm is releasably secured to a stylus arm carriage of the playback system. A system of the aforementioned type is described in detail in U.S. Pat. No. 3,842,194, issued to J. K. Clemens, and entitled "INFORMATION RECORDS AND RECORDING/PLAYBACK SYSTEMS THEREFOR".

In such systems, it is desirable that the stylus/record relative velocity be kept at a substantially constant value. In the U.S. Pat. No. 3,912,283 issued to Hammond et al., and entitled "TURNTABLE SPEED LOCK SYSTEM", an apparatus is disclosed for keeping the average turntable speed at a fixed value (e.g., 450 rpm).

In addition to keeping the average turntable speed at a predetermined value, it is desirable to compensate for instantaneous cyclical deviations in stylus/record relative velocity to prevent "jitter" of the displayed television picture. Such cyclical deviations are, for example, caused by record eccentricity, warpage, mechanical irregularities, etc. The cyclical deviations in the stylus/record relative velocity can be offset by imparting translatory motion to the groove-riding stylus in a manner that opposes such cyclical deviations. A reference may be made to the U.S. Pat. No. 3,711,641, issued to R. C. Palmer, and entitled "VELOCITY ADJUSTING SYSTEM", for an example of a translatory motion imparting means (also referred to herein as the "arm-stretcher" apparatus).

The Palmer patent discloses a circuit for sensing deviations in the frequency of the horizontal synchronizing pulses derived from the signal pickup output to develop an error correction signal which is representative of the cyclical deviations in the stylus/record relative velocity. As an alternative to the aforementioned sensing of the horizontal sync frequency variations to obtain control information for the armstretcher transducer, such information may be derived via phase comparison of the color synchronizing burst component of the signals recovered from the disc with the output of a stable reference oscillator, as shown in the U.S. Pat. No. 3,965,482, issued to T. W. Burrus, and entitled "VELOCITY CORRECTION CIRCUIT FOR VIDEO DISCS".

The present invention relates to an advantageous transducer apparatus for use in velocity correction systems. Pursuant to the instant invention, a novel armstretcher apparatus includes a polymer bimorph transducer, mechanically interposed between the stylus arm and stylus arm support and electrically coupled to an error correction signal developing means, for opposing cyclical deviations in the stylus/record relative velocity.

In accordance with a further feature of the present invention, the polymer bimorph transducer is mounted within a replaceable pickup cartridge.

Pursuant to a still further feature of the invention, the polymer bimorph transducer comprises a corrugated metallized strip of polyvinylidene film with adjacent folds of the corrugated strip bonded together, and with the correction signals applied to electrodes formed by the metallization. In the drawings:

FIG. 1 is a diagram, partly in block form, illustrating a video disc system incorporating a velocity correction system in accordance with the instant invention;

FIG. 2 illustrates a replaceable pickup cartridge housing a polymer bimorph transducer suitable for use in the velocity correction system of FIG. 1;

FIG. 3 shows the rear view of the pickup cartridge of FIG. 2.

Figure 4:
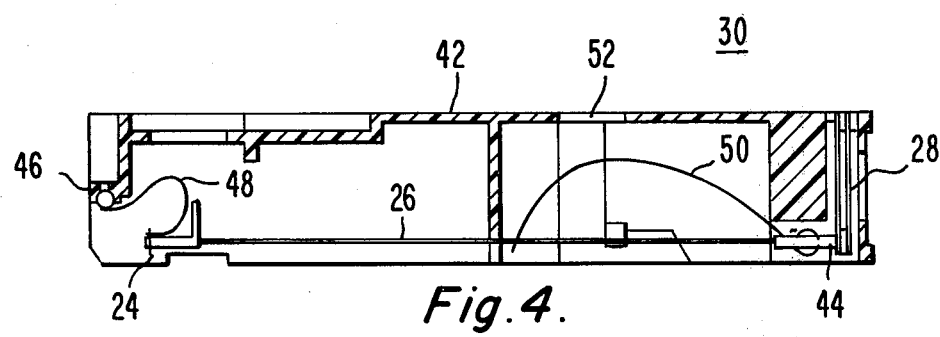
FIG. 4 is a cross-sectional view of the pickup cartridge of FIGS. 2 and 3.

In FIG. 1, there is shown a video disc system 20 of the type shown in the Clemens' patent. The video disc system includes a turntable for rotatably supporting a video disc 22. A turntable drive mechanism is provided for rotating the turntable-supported disc 22 at a predetermined speed (e.g., 450 rpm). The recorded information is contained in the form of geometric variations provided in the bottom of a smooth, spiral groove disposed on the major surface of the disc 22. The capacitance variations between a conductive coating on the disc 22 and an electrode incorporated in a groove-riding stylus are sensed to reconstruct the recorded video information during playback.

The stylus 24 is carried at the free end of a stylus arm 26. The other end of the stylus arm 26 is secured to a polymer bimorph transducer 28 having piezoelectric characteristics mounted within a replaceable pickup cartridge 30. As will be explained later, the desired translational motion of the stylus 24 will occur upon the application of appropriate electrical signals to the transducer 28. The pickup cartridge 30 is demountably received in a carriage 32, which is driven in correlation with the groove-riding stylus 24 during playback to reduce the tracking error and the tracking load on the stylus.

The stylus electrode is coupled to a pickup circuit 34 which translates the stylus/disc capacitance deviations into electrical signal variations. An example of the pickup circuit 34 can be found in the U.S. patent application, Ser. No. 743,144, filed in the name of H. Kawamoto, et al., on Nov. 18, 1976, entitled "PICKUP CIRCUITRY FOR A VIDEO DISC PLAYER WITH PRINTED CIRCUIT BOARD", and now U.S. Pat. No. 4,080,625.

The output of the pickup circuit 34 is applied to a signal processing circuit 36 for transforming the input thereto onto an output composite signal in the NTSC format for application to a conventional television receiver 38. Reference may be made to the U.S. Pat. No. 3,969,757, issued to J. G. Amery, and entitled "COLOR IMAGE SIGNAL PROCESSING CIRCUITS", for an illustration of the signal processing circuit.

A velocity correction circuit 40 is coupled to the signal processing circuit 36 for developing an error correction signal representative of cyclical variations in the stylus/record relative velocity. The polymer bimorph transducer 28 is electrically coupled to the output of the velocity correction circuit 40. The polymer bimorph transducer 28, responsive to the error correction signal, imparts translatory, cyclical motion to the groove-riding stylus in a manner that opposes variations in the stylus/record relative velocity during playback. For example, if the instantaneous, stylus/record relative velocity is increasing, the transducer 28 advances the stylus along the record groove. The reverse happens if the instantaneous stylus/record relative velocity is decreasing. Thus, the rate and the direction of the stylus displacement resulting from the operation of the transducer 28 is determined by the error in the stylus/record relative velocity.

The U.S. Pat. No. 3,965,482, issued to T. W. Burrus, and entitled "VELOCITY CORRECTION CIRCUIT FOR VIDEO DISCS", describes one form of the velocity correction circuit 40. As previously indicated, the Burrus system derives the velocity error correction signal by phase comparison of the color synchronizing burst component of the signals recovered from the disc with the output of a stable reference oscillator. In the system illustrated in the Burrus patent, the velocity error correction signal energizes an electrical winding to cause cyclical compensatory motion of the groove-riding stylus. Since the polymer bimorph transducer, utilized pursuant to this invention, is not a current actuated device, a slight modification of the Burrus' velocity error correction circuit would be required: e.g., using a high output impedance transistor driving stage to apply the compensating signal to the bimorph transducer.

FIG. 2 illustrates a perspective view of the demountable pickup cartridge 30. FIGS. 3 and 4, respectively, show the rear view and the cross-sectional view of the pickup cartridge 30.

The pickup cartridge 30 comprises a cartridge housing or body 42. One end of the polymer bimorph element 28 is secured to the cartridge body 42. The pickup arm 26 is connected to the other end of the bimorph element 28 via an elastic coupler 44 as shown in FIG. 4. The free end of the pickup arm 26 carries the stylus 24. The electrode incorporated in the stylus 24 is coupled to a terminal 46 via a conductive leaf spring 48. When the cartridge 30 is received in the carriage housing 32, the terminal 46 is connected to the pickup circuit 34.

The cartridge 30 further includes a wire spring 50 for releasably holding the pickup arm 26 in the retracted condition within the confines of the cartridge body 42. When the cartridge 30 is installed in the player, a lever (not shown) enters the cartridge body through an opening 52 to defeat the wire spring 50, thereby releasing the pickup arm 26.

The transducer 28 is electrically coupled to a pair of terminals 54 and 56 shown in FIG. 3. Electrical contact is established between the output terminals of the velocity correction circuit 40 and the terminals 54 and 56 of the transducer upon containment of the cartridge 30 in the carriage housing 32.

Figure 5:
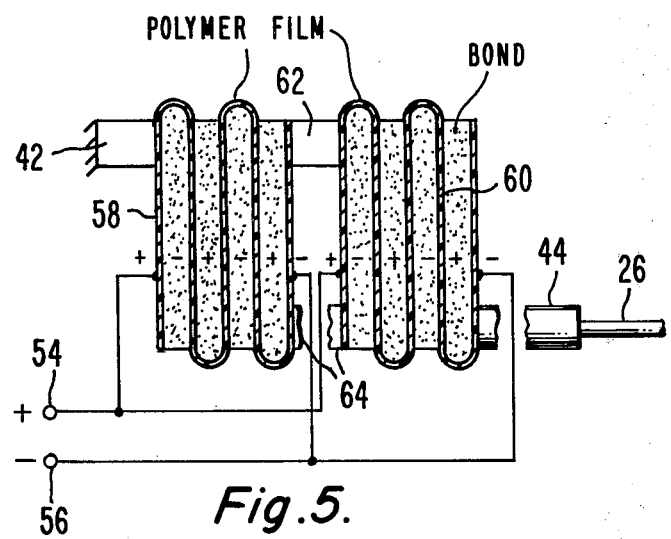
FIG. 5 illustrates a configuration of the multi-layer, polymer bimorph transducer suitable for use in the velocity correction system of FIG. 1.

FIG. 5 shows construction details of an illustrative configuration of the multi-layer, polymer, bimorph transducer 28. The transducer 28 comprises corrugated, metallized strips 58 and 60 of polyvinylidene fluoride membrane (PVF$_2$) having piezoelectric properties. The adjacent folds of the corrugated metallized strips are bonded together by a non-conductive bonding agent. The polymer strips 58 and 60 are connected to each other by means of blocks 62 and 74. The blocks 62 and 64 can be formed from material such as plastic. The opposite edges of the bimorph element 28 are secured, respectively, to the cartridge body 42 and the pickup arm coupler 44.

Illustratively, the dimensions of the transducer 28 are as follows: the thickness of the polyvinylidene fluoride (PVF$_2$) film—9 micrometers, the thickness of the metallization on the PVF$_2$ film—400 angstroms, the thickness of the bonding agent layers—0.3 micrometers, transducer width (dimension perpendicular to the plane of FIG. 5)—25 millimeters, transducer height—17 millimeters, overall transducer depth (transducer dimension parallel to the longitudinal axis of the pickup arm)—1 millimeter.

The polyvinylidene film is of the type manufactured by KUREHA Corporation of America, 420 Lexington Avenue, Suite 2144, New York, New York, 10017. The metallization is in the form of aluminum coatings. The adjacent folds of the corrugated PVF$_2$ film strips are bonded together by epoxy resin. It is important to minimize the thickness of the epoxy layers, since the epoxy layers are not actively useful in the device action. Usually, liquid epoxy resin becomes solid after mixing with hardener. The epoxy resin and the hardener are separately coated on the surfaces to be bound, and almost completely wiped off. Thus, a very thin layer covers each surface and does not harden during the coating and wiping off process. The surfaces are then pressed together to form a tight bond.

The design of the polymer bimorph transducer 28 (e.g., number of layers, dimensions, etc.) is governed by considerations such as: resonance characteristics of the device, peak-to-peak stylus displacement required, mechanical load coupled to the transducer, etc.

Figure 6:
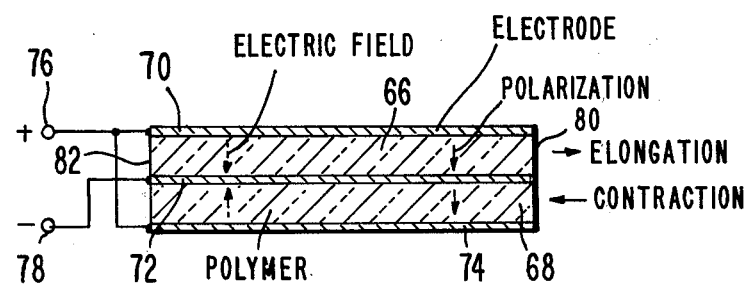
FIGS. 6, 7 and 8 show alternative configurations of the multi-layer, polymer bimorph transducers suitable for use in the velocity correction system of FIG. 1.
Figure 7:
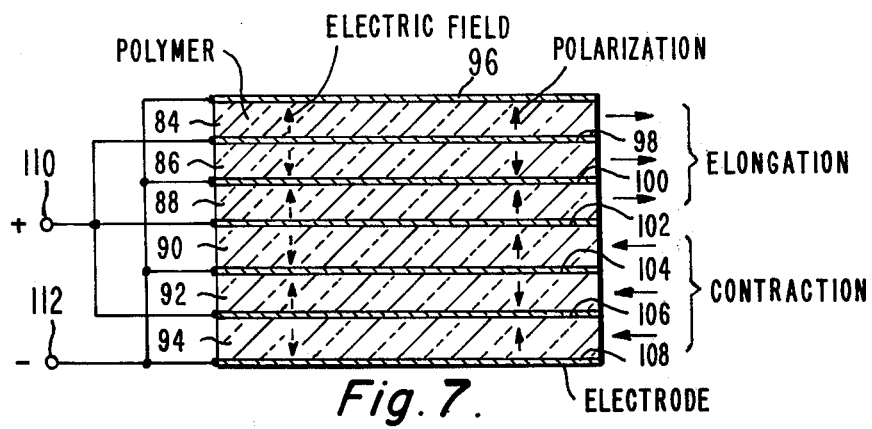
Figure 8:
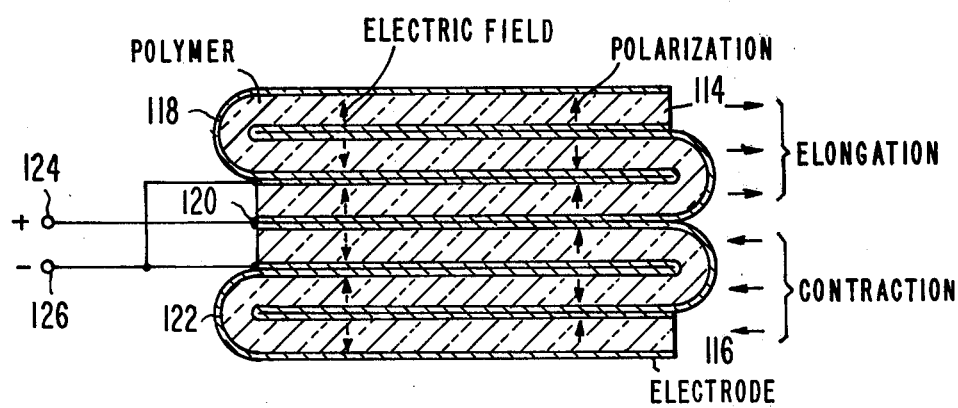

FIGS. 6, 7 and 8 show alternative configurations of the multi-layer, polymer bimorph transducer suitable for use in the velocity correction system. In FIG. 6, the numerals 66 and 68 denote polymer films and numerals 70, 72 and 74 represent electrodes. The outside electrodes 70 and 74 are connected to a terminal 76 and the middle electrode 72 is coupled to a terminal 78. The velocity error correction voltage is applied to the terminals 76 and 78. When the applied electric field (shown by dotted arrows) is in the same direction as the direction of polarization (shown by solid arrows), the polymer film extends. The polymer film shrinks when the applied electric field is in the opposite direction to the direction of the polarization. Illustratively, with the electric field polarity shown in FIG. 6, the end 80 of the FIG. 6 structure would bend downward if the opposite end 82 thereof were fixedly secured (due to elongation of the film 66 and the contraction of the film 68). If the polarity is reversed, the end 80 of the bimorph structure would bend upward.

In the FIG. 7 bimorph structure, the numerals 84–94 denote polymer films, and the numerals 96–108 represent electrodes. The electrodes 96–108 are electrically connected to the terminals 110 and 112 as shown therein.

In the FIG. 8 electro-motional device, the numerals 114 and 116 designate the corrugated polymer films, and the numerals 118, 120 and 122 represent electrodes. The electrodes 118–122 are electrically connected to the terminals 124 and 126 as shown therein.

In the bimorph structures shown in FIGS. 7 and 8, the electric field direction corresponds to the polarization direction in the upper half layers, but these directions are opposite to each other in the lower half layers.

The operation of the bimorph structures illustrated in FIGS. 7 and 8 is similar to that of the FIG. 6 bimorph structure.

Figure 9:
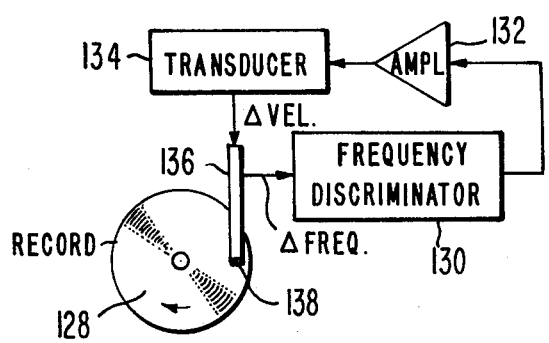
FIG. 9 is a diagram, partly in block form, of a modified velocity correction system pursuant to this invention.

FIG. 9 is a diagram, partly in block form, of a modified velocity error correction system. The playback circuitry, herein, includes a horizontal sync separator which separates the horizontal sync pulses from the composite television signal recovered from the record. When the record is rotated at precisely the predetermined speed (e.g., 450 rpm), the frequency of the detected horizontal sync pulses is the same as the desired horizontal sync frequency (e.g., 15.734 KHz). If the turntable has a rotational speed somewhat slower or faster than the predetermined playback speed, the detected sync pulse frequency will be lower or higher, respectively, than the desired horizontal sync frequency.

As shown in FIG. 9, the variations in the frequency of the horizontal sync pulses recovered from a record 128 are detected by a frequency discriminator 130 for developing an error voltage at the output thereof. An amplifier 132 amplifies and shapes the input error voltage and generates an output drive signal for application to a bimorph transducer 134. The transducer 134, responsive to the drive signal, imparts cyclical translatory motion to a stylus arm 136 carrying a groove-riding stylus 138 in a manner that opposes variations in the stylus-record relative velocity. A reference may be made to the U.S. Pat. No. 3,711,641, issued to R. C. Palmer, entitled "VELOCITY ADJUSTING SYSTEM", for an example of circuitry used for developing a velocity error correction signal utilizing horizontal sync pulses recovered from a disc record.

Figure 10:
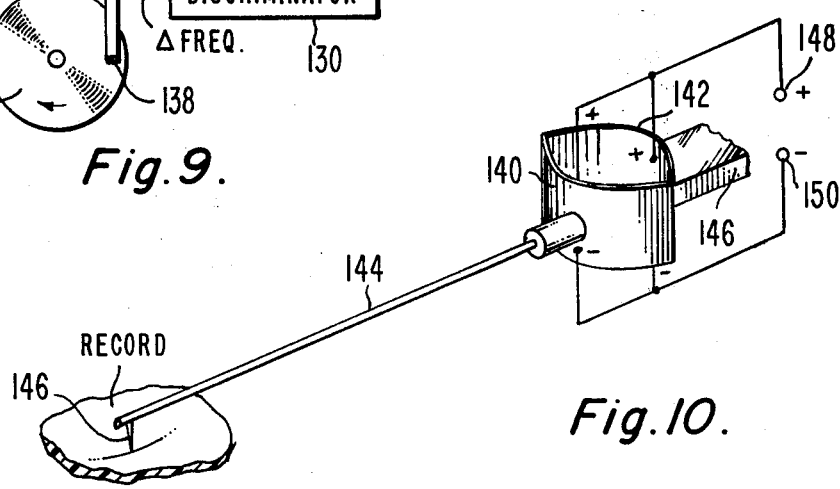
FIG. 10 illustrates a push-pull arrangement of a polymer bimorph transducer suitable for use with the velocity correction systems of FIGS. 1 and 9.

FIG. 10 illustrates still another configuration of a velocity correction system pursuant to this invention. As shown therein, a pair of piezoelectric, polymer, multi-layer bimorph elements 140 and 142 are secured to each other along their edges in a push-pull arrangement. A stylus arm 144, carrying a groove-riding stylus 146, is secured to the bimorph element 140. The bimorph element 142 is secured to a support 147. A velocity error correction signal is applied to the bimorph elements 140 and 142 via terminals 148 and 150 for causing compensating, cyclical, translatory motion of the groove-riding stylus 146.

The polymer bimorph transducer apparatus, pursuant to this invention, is relatively inexpensive, possesses simple structure, occupies relatively little space, is light weight, has capacitive impedance, consumes very little power, provides stylus displacement linearity, and imposes very modest driving circuit requirements.

What is claimed is:

1. A pickup cartridge for use in a velocity adjusting system for opposing undesired cyclical variations in the relative velocity between a rotating disc record and a pickup means which is positioned adjacent to successive regions of a spiral information track disposed on the surface of said disc record for playing back signals recorded along said track; said pickup cartridge being removably subject to reception in a carriage which is translated along a path radially disposed relative to said disc record in correlation with radial motion of said pickup means during playback of said recorded signals; said system including means for developing a correction signal in response to cyclical variations of said relative velocity; said pickup cartridge comprising:
    (A) a demountable cartridge housing;
    (B) a pickup arm mechanically supporting said pickup means at one end thereof;
    (C) a piezoelectric bimorph element having a first edge and a second edge; said first edge being mechanically secured to said cartridge housing such tht said piezoelectric element is disposed within the confines of said cartridge housing; said second edge being mechanically secured to the other end of said pickup arm remote from said pickup means; and
    (D) terminals disposed on said cartridge housing for applying the output of said signal developing means to said piezoelectric bimorph element when said cartridge is received in said carriage;
    said piezoelectric bimorph element being so arranged that said application of said correction signal causes translation of said pickup means relative to said record along said information track throughout the range of said translation in a manner that opposes said cyclical variations.

2. The pickup cartridge as defined in claim 1 wherein said bimorph element comprises a multilayer structure made from a piezoelectric polymer film.

3. The pickup cartridge as defined in claim 2 wherein said piezoelectric polymer film is made from a polyvinylidene fluoride membrane.

4. The pickup cartridge as defined in claim 3 wherein major surfaces of said polyvinylidene fluoride membrane are provided with conductive coatings; said conductive coatings serving as electrodes for application of said correction signal to said bimorph element.

5. The pickup cartridge as defined in claim 4 wherein said polyvinylidene fluoride membrane is polarized in a direction orthogonal to said electrode surfaces.

6. The pickup cartridge as defined in claim 5 wherein said multilayer structure comprises a corrugated metallized strip of polyvinylidene fluoride membrane; adjacent folds of said corrugated strip being bonded together.

7. The pickup cartridge as defined in claim 6 wherein said securing of said second edge of said bimorph element to said pickup arm is such that said pickup arm is disposed in a direction perpendicular to said edges of said bimorph element.

8. The pickup cartridge as defined in claim 7 for use with a disc record having a signal-bearing spiral groove disposed on the major surface thereof; wherein said pickup means includes a groove-riding stylus having a longitudinal axis; wherein said securing of said first edge of said bimorph element to said cartridge housing is such that (1) said pickup arm is disposed parallel to the tangent to the spiral groove at the point of stylus/- record engagement, and (2) said longitudinal axis of said stylus is disposed orthogonal to said major surface of said record during playback.

9. A pickup cartridge for use in a velocity adjusting system for opposing undesired cyclical variations in the relative velocity between a rotating rigid disc record and a pickup stylus which is positioned adjacent to successive regions of a spiral information track disposed on the surface of said disc record for playing back signals recorded along said track; said pickup cartridge being removably subject to reception in a carriage which is translated along a path radially disposed relative to said disc record in correlation with radial motion of said pickup stylus during playback of said recorded signals; said system including means for developing a correction signal in response to cyclical variations of said relative velocity; said cartridge comprising:

(A) a demountable cartridge housing;
(B) a pickup arm mechanically supporting said pickup stylus at one end thereof;
(C) a piezoelectric bimorph element having a first edge and a second edge; said first edge being mechanically secured to said cartridge housing such that said piezoelectric element is disposed within the confines of said cartridge housing;
(D) an elastic coupler for mechanically securing said second edge of said piezoelectric element to the other end of said pickup arm remote from said pickup stylus; and
(E) terminals disposed on said cartridge housing for applying the output of said signal developing means to said piezoelectric bimorph element when said cartridge is received in said carriage;

said piezoelectric bimorph element being so arranged that said application of said correction signal causes translation of said pickup stylus relative to said disc record along said information track throughout the range of said translation in a manner that opposes said cyclical variations.

* * * * *

UNITED STATES PATENT AND TRADEMARK OFFICE
CERTIFICATE OF CORRECTION

PATENT NO. : 4,162,511

DATED : July 24, 1979

INVENTOR(S) : Minoru Toda et al.

It is certified that error appears in the above-identified patent and that said Letters Patent is hereby corrected as shown below:

Column 4, line 17 - change "74" to -- 64 --

Column 6, line 22 - change "tht" to -- that --

Signed and Sealed this

Eighth Day of January 1980

[SEAL]

Attest:

SIDNEY A. DIAMOND

Attesting Officer *Commissioner of Patents and Trademarks*